United States Patent Office 2,722,503
Patented Nov. 1, 1955

2,722,503

CONVERSION OF HIGH-SULFUR OIL OVER SILICA-MAGNESIA CATALYST

Edward A. Hunter, Baton Rouge, and Marnell A. Segura, Denham Springs, La., assignors to Esso Research and Engineering Company, a corporation of Delaware No Drawing. Application November 29, 1951,
Serial No. 258,988

4 Claims. (Cl. 196—50)

This invention relates to an improvement in catalytic cracking of petroleum over silica-containing catalysts. More specifically it relates to a process wherein high-sulfur feed stocks are cracked over silica-magnesia catalyst in the presence of ammonia. The main advantage of the invention is that the presence of ammonia greatly reduces the coke deposition which normally takes place when high-sulfur feed stocks are cracked over silica-magnesia catalysts.

In recent years silica-magnesia cracking catalysts have become increasingly popular since they generally produce greater yields of naphtha than silica-alumina catalysts. However, especially with high-sulfur feed stocks, the silica-magnesia catalysts have sometimes been found to suffer from excessive catalytic coke formation. Accordingly, the main object of the present invention has been the reduction of coke formation in the catalytic cracking of high-sulfur feed in the presence of silica-magnesia catalysts. Other objects as well as the nature and novelty of the present invention will become apparent from the following description.

It has previously been disclosed in U. S. Patent 2,484,258 that treatment of silica-alumina catalysts with rather concentrated aqueous ammonium hydroxide solutions as part of the catalyst manufacturing procedure results in a reduction of coke formation when conventional feed stocks are cracked over the resulting catalyst. It seems that such ammonia treatment produces a catalyst of larger mean pore diameter and somewhat lower catalytic activity than untreated catalysts, and consequently leads to reduced coke formation. This result appears to be closely tied in with the aqueous state of the ammonia treating agent. No similar reduction in coke formation is obtained by the mere addition of a low concentration of ammonia vapor to silica-alumina catalysts, regardless whether the latter are contacted with ammonia vapor in a separate pretreating step or in the course of the catalytic conversion of the hydrocarbon feed.

Nevertheless, the addition of ammonia vapor to silica-alumina catalysts has also been proposed previously, for the specific purpose of counteracting the deactivating effect of water vapor on these catalysts. Accordingly, it has been suggested in U. S. Patent 2,412,868 that the adverse effect of steam on the activity of silica-alumina catalysts can be reduced by injecting ammonia gas into any high temperature zone of a cracking process wherein substantial amounts of water vapor are present, such as in the stripping zone or in the cracking or regeneration zones. However, this may actually increase coke formation with various feeds, as shown later herein.

Attempts to apply the prior art teachings to the present coke formation problem have proved unsuccessful. Specifically, when silica-magnesia catalysts were modified by treatment with aqueous ammonia in the manner previously suggested for silica-alumina catalysts, and then used for cracking high-sulfur feed stocks, the resulting catalytic coke yields were found to be materially the same as in the case of untreated silica-magnesia catalyst.

However, contrary to the previous experience with silica-alumina catalysts, it has now been discovered that the addition of minor amounts of ammonia vapor to the cracking zone, conjointly with the hydrocarbon feed, are highly effective in reducing coke formation in the conversion of high-sulfur oils over silica-magnesia catalysts.

The following examples particularly illustrate advantageous ways of cracking high-sulfur feed stocks over silica-magnesia catalyst according to the present invention.

A silica-magnesia catalyst containing about 70% $SiO_2$ and 30% MgO by weight was prepared in a conventional manner, as follows: 24 liters of a commercial sodium silicate solution containing 3.25 moles of $SiO_2$ per mole of $Na_2O$, specific gravity 1.21, were added with vigorous agitation to 12 liters of sulfuric acid, sp. gr. 1.19. The resulting clear silica hydrosol contained about 140 g. $SiO_2$ per liter and was about 0.75 normal in free sulfuric acid.

This hydrosol was vigorously mixed with a slurry of 2700 g. of calcined finely divided magnesia in 6 liters of water. The mixture set in less than one minute to a stiff true hydrogel. The set hydrogel was broken up to ⅛ to ½-inch pieces and washed with water until essentially free of sulfate ion. The washed material was then dried by conventional means at about 200 to 500° F., and activated by calcining for 3 hours at 1200° F. in a muffle furnace exposed to the atmosphere.

The dry catalyst was pilled, divided into four portions and used in four comparative 30-minute cracking runs in a standard test unit. Elk Basin gas oil was used as feed in all four runs and the results are shown in Table I. The gas oil had the following characteristics:

Distillation:

| | |
|---|---|
| I. B. P., °F | 308 |
| 5% at °F | 583 |
| 10% at °F | 617 |
| 20% at °F | 645 |
| 30% at °F | 660 |
| 40% at °F | 674 |
| 50% at °F | 688 |
| F. B. P., °F | 700 |
| Percent recovery | 59.0 |
| Gravity, °API | 22.8 |
| Sulfur, wt. percent | 2.288 |
| Aniline Point, °F | 164 |
| Ash, wt. percent | 0.0014 |

*Table I*

| Run No | 1 | 2 | 3 | 4 |
|---|---|---|---|---|
| Treatment During Cracking Cycle | None | 5.2 wt. percent steam (from $H_2O$) based on Oil Feed | 5 wt. percent Steam +0.25 wt. percent Ammonia (from 10% aq. $NH_4OH$) based on Oil Feed | |
| Temperature, °F | 941 | 944 | 955 | 963 |
| Feed Rate, v./v./hr | 2.00 | 2.00 | 2.03 | 2.03 |
| Catalyst Pill Density | 0.85 | 0.85 | 0.86 | 0.86 |
| Vol. Percent Conversion | 44.2 | 43.5 | 46.3 | 47.6 |
| Gas Density | 0.92 | 0.82 | 0.89 | 0.89 |
| Gas Yield, Wt. Percent | 11.0 | 11.3 | 11.5 | 12.1 |
| Coke Yield, Wt. Percent | 5.1 | 5.0 | 4.5 | 4.5 |
| Coke Yield at 40% Conversion, Wt. Percent | 4.1 | 4.1 | 3.2 | 3.1 |
| Gas, Cu. Ft./Bbl. Feed | 507 | 540 | 507 | 533 |
| Percent Recovery | 97.8 | 96.3 | 96.1 | 95.3 |

Comparing runs 1 and 2, it is seen that steam alone, resulting from the addition of 5% of water to the oil feed, has no effect on coke formation and that it actually has a slight adverse effect on distillate yield. On the other hand, runs 3 and 4 show that a slight concentration of ammonia vapors, resulting from the addition of aqueous ammonia solution to the feed, is surprisingly effective in reducing the amount of coke formed from the high-sulfur feed used.

For purposes of strict comparison, and to eliminate the conversion level as a variable, the tabulated data contain not only the actual carbon yields obtained in each run, but also carbon yields corrected to a common level of 40% conversion. It can be seen that at this level the coke produced in runs 3 and 4 in the presence of ammonia is some 25% less than in control runs 1 and 2.

For further comparison, two additional runs, Nos. 5 and 6, were made wherein the same feed stock was similarly cracked in the presence of a conventional silica-alumina catalyst, with and without the addition of ammonia. In both of these runs the Elk Basin gas oil was fed to the standard test unit at a rate of 2.0 v./v./hr. and cracked at a temperature of 950° F. in the course of a cracking cycle lasting 30 minutes. As in run 2 previously described, the feed in run 5 contained 5 wt. per cent of added water to produce steam in the cracking zone, and the feed in run 6 contained 5 wt. per cent of an aqueous solution containing 10 wt. per cent ammonia to produce a mixture of steam and ammonia gas in the reaction zone for comparisons with previous runs 3 and 4. The results are summarized in Table II.

Table II

| Run No. | 5 | 6 |
| --- | --- | --- |
| Treatment During Conversion | 5 wt. percent Steam based on Oil | 5 wt. percent steam+0.25 wt. percent NH₃ based on oil |
| Vol. Percent Conversion | 51.0 | 53.4 |
| Gas Density | 1.12 | 1.01 |
| Gas Yield, Wt. Percent | 16.4 | 17.4 |
| Coke Yield, Wt. Percent | 4.6 | 5.0 |
| Coke Yield @ 51% Conv., Wt. Percent | 4.5 | 4.6 |

The above results show that, in accordance with prior art teachings, the addition of ammonia reduces the deactivating effect of steam. However, it is also apparent that more coke was actually formed in run 6 wherein ammonia was added, than in control run 5. Some of this increased coke was of course due to the slightly higher conversion in run 6. Nevertheless, it is clear that even at the same conversion level the addition of ammonia does not appreciably reduce coke formation when cracking high sulfur feed stocks over silica-alumina catalysts. In contrast, it has been demonstrated in Table I that ammonia vapor addition is exceedingly effective in reducing coke formation when cracking over silica-magnesia rather than silica-alumina catalysts under similar conditions.

A comparison of the coke data in Table II with those in Table I also indicates that high-sulfur feed stocks normally produce materially less coke when cracked over silica-alumina than over silica-magnesia catalysts. This becomes especially clear when it is realized that run 5 shown in Table II was carried to higher conversions than comparable run 2 in Table I. At equal conversions, it is apparent that the coke yield in run 5, Table II, will be very substantially lower than in run 2, Table I. This illustrates the particular importance of reducing coke formation when using silica-magnesia catalysts for cracking high-sulfur feeds.

The present invention wherein coke formation on silica-magnesia catalyst is reduced by adding ammonia vapor to the cracking zone is not merely a low order effect comparable with the previously proposed treatment of silicious catalysts with strong ammonia solutions prior to the conversion step. Treatment of the silica-magnesia catalysts with ammonia vapors prior to the actual conversion step has shown no appreciable effect on subsequent coke deposition. On the contrary, it is essential herein to add the ammonia to the cracking zone substantially concomitantly with the hydrocarbon feed.

It is known that the previously proposed pre-treatment of silica-alumina catalysts with aqueous ammonia resulted in a reduction of coke formation during cracking, which was due to a permanent change in the structure and activity of the catalyst proper. In contrast, the presently proposed ammonia treatment appears to affect the actual mechanism of the hydrocarbon cracking reaction, rather than having any permanent effect on the catalyst. This is illustrated by the four runs summarized in Table III below.

In each run a West Texas gas oil was cracked in the standard test unit over a synthetic composite catalyst prepared substantially as described in Example I and containing about 67% silica and 33% magnesia by weight. 200 cc. of 3/16" x 3/16" pills of the catalyst were charged to the test unit to form a fixed bed therein and each run consisted of two conversion cycles separated by a regeneration cycle. The West Texas gas oil had the following characteristics:

Distillation:
I. B. P., °F _____ 439
5% at °F _____ 502
10% at °F _____ 523
20% at °F _____ 548
30% at °F _____ 576
40% at °F _____ 601
50% at °F _____ 632
60% at °F _____ 662
70% at °F _____ 690
F. B. P., °F _____ 700
Per cent recovery _____ 74
Gravity, °API _____ 29.3
Sulfur, weight per cent _____ 1.68
Aniline point, °F _____ 165
Ash, weight per cent _____ 0.0007

In the first conversion cycle the gas oil was passed over the catalyst bed at 950° F. for two hours at a rate of 0.6 v./v./hr., and the resulting cracked hydrocarbon product was discarded. The catalyst was then regenerated by passing a mixture of inert gas and oxygen over it until the coke formed in first conversion cycle was burned off. Throughout this regeneration cycle the temperature of the catalyst was kept below 1000° F.

Table III

| Run No. | 7 | 8 | 9 | 10 |
| --- | --- | --- | --- | --- |
| Treatment: | | | | |
| 1st Cycle | 5 wt. percent steam (based on oil) | 5 wt. percent steam +0.25 wt. percent NH₃ | 5 wt. percent steam | 5 wt. percent steam +0.25 wt. percent NH₃ |
| 2d Cycle | 5 wt. percent steam (based on oil) | 5 wt. percent steam | 5 wt. percent steam +0.25 wt. percent NH₃ | 5 wt. percent steam +0.25 wt. percent NH₃ |
| Conversion, Vol. Percent | 64.9 | 63.7 | 66.1 | 65.0 |
| Coke Yield, Wt. Percent (@ 65% conv.) | 5.1 | 5.1 | 4.6 | 4.7 |

Finally, during the second conversion cycle fresh West Texas gas oil was passed over the regenerated catalyst bed at 950° F. at a rate of 0.6 v./v./hr. for two hours. The resulting hydrocarbon products were collected and analyzed to determine the degree of conversion. The catalyst was cooled, discharged, and analyzed for carbon in order to determine the coke yield obtained in the second cycle.

Additions of steam or a mixture of steam and ammonia were made along with the feed stock during the cracking cycles of all four runs as indicated in Table III which also contains the corresponding analytical results.

Run 8 shows that one conversion cycle with ammonia followed by one cycle with steam shows no reduction in carbon formation during the second cycle as compared with run 7 wherein steam alone was used in both cycles. This indicates that whatever effect the ammonia addition may have had in the first cycle of run 8, none of it is reflected in the second cycle. If the ammonia vapor had an effect on the catalyst itself, as in the case in treating catalysts with strong aqueous ammonia solutions, the ammonia treatment in the first cycle of run 8 would be expected in reduce coke formation also in subsequent conversion cycles.

In contrast to run 8, a very marked reduction in coke formation was obtained in the second conversion cycle of run 9 wherein ammonia was added, but wherein steam alone was added to the first conversion cycle.

Finally, run 10 shows that when ammonia is added both to the first and to the second conversion cycle, the carbon reduction in the second cycle is no better than that obtained in run 9. This again confirms that the ammonia has no cumulative or lasting effect on coke formation, but is effective only while fresh ammonia vapor is actually added to or present in the reactor wherein the hydrocarbon feed is being cracked.

Another point illustrated in Table III is that with the West Texas feed, the ammonia addition in runs 9 and 10 results in coke formation which is about 10% lower than the coke formation in the blank run. While this reduction is quite marked, it will be noticed that it is appreciably smaller than that obtained with the Elk Basin oil as described in Table I, wherein a reduction of about 25% was obtained. Since the West Texas feed contained only about 1.7% sulfur as against 2.3% sulfur for the Elk Basin feed, this is believed to indicate that the effectiveness of ammonia as a coke repressing agent decreases somewhat as the sulfur content of the hydrocarbon feed stock decreases.

The ammonia treatment of the present invention must be done substantially in the manner described above if it is to be effective in reducing carbon formation when cracking high-sulfur feeds over silica-magnesia catalyst. For instance, the treatment of the catalyst with aqueous ammonia before drying and charging to the cracking unit, suggested in U. S. Patent 2,484,258 for the purpose of reducing the carbon-forming properties of conventional silica-alumina cracking catalysts, has been found ineffectual when a silica-magnesia catalyst is used for cracking high-sulfur feeds. This is illustrated in the following runs.

A cracking catalyst containing about 70% silica and 30% magnesia was prepared as described earlier herein, washed, dried and activated by heating for 3 hours at 1200° F. in air. The resulting activated catalyst was divided into four portions. In run 11, the first portion was used directly for cracking a wide-cut Elk Basin gas oil in the previously described test unit at a feed rate of 2 v./v./hr. and at a temperature of 950° F. for a 30-minute cycle.

In run 12 another 900 g. portion of the activated catalyst made into a paste with about 750 grams of distilled water, heated for 20 hours at 200° F. in a beaker covered with a watch-glass, dried, and the dry catalyst was activated by heating for 3 hours at 1200° F. The activated catalyst was used for cracking another batch of the Elk Basin gas oil under the same conditions as in run 11.

Finally, runs 13 and 14 were made in the same manner as run 12, except that the catalyst was slurried in aqueous ammonia instead of water. Specifically, in run 13 the catalyst treatment consisted of making the paste with dilute aqueous ammonia, equivalent to 0.25% $NH_3$ on catalyst and thus corresponding approximately to the amount of ammonia contacted by the catalyst in one cycle of run 10, for example. In run 14 the catalyst was slurried with a 28% aqueous ammonia solution as in Example 2 of U. S. Patent 2,484,258.

Table IV

| Run No. | 11 | 12 | 13 | 14 |
| --- | --- | --- | --- | --- |
| Conversion, Wt. Percent on Feed | 53.5 | 53.2 | 54.3 | 53.7 |
| Coke Yield, Wt. Percent of Feed | 11.7 | 12.6 | 13.2 | 12.7 |

The above shows that the pre-treatment of the silica-magnesia catalyst with aqueous ammonia is ineffective in reducing carbon formation during the cracking of high-sulfur feed stocks over silica-magnesia catalyst. On the contrary, when cracking such feeds over silica-magnesia catalyst, effective carbon reduction is obtained only when ammonia vapor is added to the actual conversion step as illustrated in the preceding examples hereof.

In summary, the present invention relates to the catalytic cracking of hydrocarbon oils having a sulfur content of at least 1 weight per cent, and especially 1.5 to 5 weight per cent. This oil preferably may be a gas oil boiling between about 450 and 1100° F., although heavier fractions such as residua and also topped or whole crudes may be employed likewise.

The catalyst used is a synthetic silica-magnesia catalyst prepared in a manner well-known per se and containing about 65 to 75 weight per cent silica and about 25 to 35 weight per cent magnesia. Boria, zirconia, and other metal oxides known for their specific promoting effects may also be present in the catalyst composition in small amounts, that is, in amounts up to about 2 to 5 weight per cent.

In industrial practice such catalysts are preferably used in finely divided, powdered form so that they can be fluidized or suspended in upflowing vapors as a dense, turbulent bed in the conversion zone.

In such a "fluid" system, a portion of the catalyst is continuously drawn off from the conversion zone and passed in a stream of air or other oxygen-containing gas to a regeneration zone. In the regeneration zone carbonaceous deposits are burned off the spent catalyst particles, preferably also in a fluidized bed, and regenerated catalyst is returned to the conversion zone. As is well known, the regeneration must be carried out at temperatures below the deactivation temperature of the catalyst, that is, between about 950 to 1250° F., or usually between 1000 and 1150° F. depending on the particular catalyst used. However, the invention is equally applicable to the more dated systems employing fixed or moving beds of granular or pelletized catalyst. Conversion temperatures may range from about 850 to 1050° F. at pressures ranging from about 0 to 50 p. s. i. g.

In practicing the invention, it is preferred to add the ammonia to the conversion zone continuously along with the hydrocarbon feed so as to form therein about 0.1 to 2.0 wt. percent of ammonia vapors based on feed. It is usually convenient to add this ammonia in the form of an aqueous solution which may range in ammonia concentration between about 5 and 30 wt. percent though it is also feasible to feed ammonia to the conversion zone as a dry gas.

It is to be understood that the several foregoing examples have been given primarily for purposes of illustration and that variations may be made therein with-

We claim:

1. In a process for cracking hydrocarbon distillate oils containing 1.5 to 5 percent by weight of sulfur in the presence of a composite synthetic cracking catalyst consisting essentially of about 65 to 75 weight per cent of silica and 35 to 25 weight per cent of magnesia, the improvement which comprises passing the distillate oil through a conversion zone at about 850 to 1050° F. in the presence of ammonia vapor added in an amount equal to about 0.1 to 2 weight percent of ammonia vapor based on oil feed.

2. A process according to claim 1 wherein the ammonia is added to the conversion zone in the form of an aqueous solution containing 5 to 30 weight per cent of ammonia.

3. A process according to claim 1 wherein the ammonia is added as a dry gas.

4. In a process for cracking hydrocarbon distillate oils boiling between about 450 and 1100° F. and containing about 2 to 5 weight per cent of sulfur wherein the oil is passed through a conversion zone containing a dense turbulent fluidized bed of finely divided synthetic cracking catalyst composed of about 65 to 70 weight per cent silica and 35 to 30 weight per cent magnesia at a conversion temperature between about 850 and 1050° F. and wherein the catalyst is continuously circulated back and forth between the conversion zone and a regeneration zone wherein carbonaceous deposits are burned off spent catalyst particles in an oxygen-containing atmosphere at temperatures below the deactivation temperature of the catalyst, the improvement which comprises continuously adding ammonia to the conversion zone in a proportion equal to 0.1 to 2 weight per cent of ammonia vapor based on feed.

References Cited in the file of this patent

UNITED STATES PATENTS

| | | |
|---|---|---|
| 2,045,794 | Pier | June 30, 1936 |
| 2,321,604 | Kalichevsky | June 15, 1943 |
| 2,412,868 | Brown | Dec. 17, 1946 |
| 2,430,015 | Hatton et al. | Nov. 4, 1947 |
| 2,484,258 | Webb et al. | Oct. 11, 1949 |

OTHER REFERENCES

"Factors Controlling Aging of Cracking Catalysts," Mills et al., Petroleum Refiner, September 1951, vol. 30, pages 97 to 102.